(12) United States Patent
Kurebayashi (10) Patent No.: US 11,429,330 B2
(45) Date of Patent: Aug. 30, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Makoto Kurebayashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/108,149

(22) Filed: Dec. 1, 2020

(65) Prior Publication Data

US 2021/0365224 A1 Nov. 25, 2021

(30) Foreign Application Priority Data

May 20, 2020 (JP) .............................. JP2020-088059

(51) Int. Cl.
*G06F 3/12* (2006.01)
*H04N 1/00* (2006.01)
*G06F 3/048* (2013.01)

(52) U.S. Cl.
CPC .......... *G06F 3/1275* (2013.01); *G06F 3/1207* (2013.01); *H04N 1/00424* (2013.01); *H04N 1/00477* (2013.01); *G06F 3/048* (2013.01)

(58) Field of Classification Search
CPC ...... G06F 3/1275; G06F 3/1207; G06F 3/048; G06F 3/1204; G06F 3/1253; G06F 3/1285; H04N 1/00424; H04N 1/00477; H04N 1/1937; H04N 1/0289; H04N 1/0318; H04N 1/1039; H04N 1/02825; H04N 1/0285; H04N 1/0306; H04N 1/00045; H04N 1/0005; H04N 1/00063; H04N 1/00031; H04N 1/02895; H04N 1/0009; H04N 1/00002; H04N 1/00076; H04N 1/00034; H04N 1/00068; H04N 1/02865; H04N 1/00055; H04N 1/02815; H04N 1/00013
USPC ........................................................ 358/1.15
See application file for complete search history.

(56) References Cited

U.S. PATENT DOCUMENTS

| | | | | |
|---|---|---|---|---|
| 5,533,628 A | * | 7/1996 | Tao ........................ | B07C 5/3422 209/939 |
| 5,734,837 A | * | 3/1998 | Flores .............. | G06Q 10/06311 705/7.13 |
| 2007/0067373 A1 | * | 3/2007 | Higgins ................. | G06Q 30/00 |

FOREIGN PATENT DOCUMENTS

| | | | | |
|---|---|---|---|---|
| JP | 2007-102706 A | | 4/2007 | |
| JP | 2013-242880 A | | 12/2013 | |
| JP | 2019-86317 W | * | 5/2018 | ............. G06F 12/00 |
| JP | 2019200689 A | * | 11/2019 | ............. G06F 12/00 |

* cited by examiner

*Primary Examiner* — Darryl V Dottin
(74) *Attorney, Agent, or Firm* — Oliff PLC (57) ABSTRACT

An information processing apparatus includes a processor configured to perform control in such a way as to display a workflow image indicating a series of processes included in a workflow and change a manner in which the workflow image is displayed such that an allocation state of an operator for, among the series of processes, a target process for which there are candidates for the operator.

13 Claims, 11 Drawing Sheets

| DATA ID | PROCESSES | | OPERATOR INFORMATION | | PROGRESS INFORMATION |
| --- | --- | --- | --- | --- | --- |
| | ORDER OF PROCESSES | PROCESS ID | USER ID | ALLOCATION INFORMATION | |
| ESTIMATE | 1 | APPLICATION | USER A | — | COMPLETE |
| | 2 | APPROVAL | USER B | — | PROCESSING |
| | 3 | DISCLOSURE | USER C, D, OR E | ASSIGN TO USER C | WAITING |
| CONTRACT | 1 | APPLICATION | USER A | — | ... |
| | 2 | APPROVAL | USER C | — | ... |
| | 3 | DISCLOSURE | USER D | — | ... |
| ... | ... | ... | ... | ... | ... |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-088059 filed May 20, 2020.

BACKGROUND

(i) Technical Field

The present disclosure relates to an information processing apparatus and a non-transitory computer readable medium.

(ii) Related Art

Techniques for displaying a workflow are known. In Japanese Unexamined Patent Application Publication No. 2007-102706, for example, a technique for displaying, in a workflow, information regarding an execution state of a process performed on a document in each of individual boxes in which the process is defined. In Japanese Unexamined Patent Application Publication No. 2013-242880, a technique for causing a client to display order of activities in a workflow and select operators to perform the activities.

SUMMARY

There might be candidates for an operator who is to perform each of processes included in a workflow. In this case, operators are allocated in accordance with progress of the processes and the like, but it is not visually clear which one of the candidates is to perform each of the processes.

Aspects of non-limiting embodiments of the present disclosure relate to clear indication of allocation states of operators in a workflow image at a time when there are candidates for an operator who is to perform each of the processes included in a workflow.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to perform control in such a way as to display a workflow image indicating a series of processes included in a workflow and change a manner in which the workflow image is displayed such that an allocation state of an operator for, among the series of processes, a target process for which there are a plurality of candidates for the operator.

BRIEF DESCRIPTION OF THE DRAWINGS

An exemplary embodiment of the present disclosure will be described in detail based on the following figures, wherein.

DETAILED DESCRIPTION

1. Configuration

Figure 1:
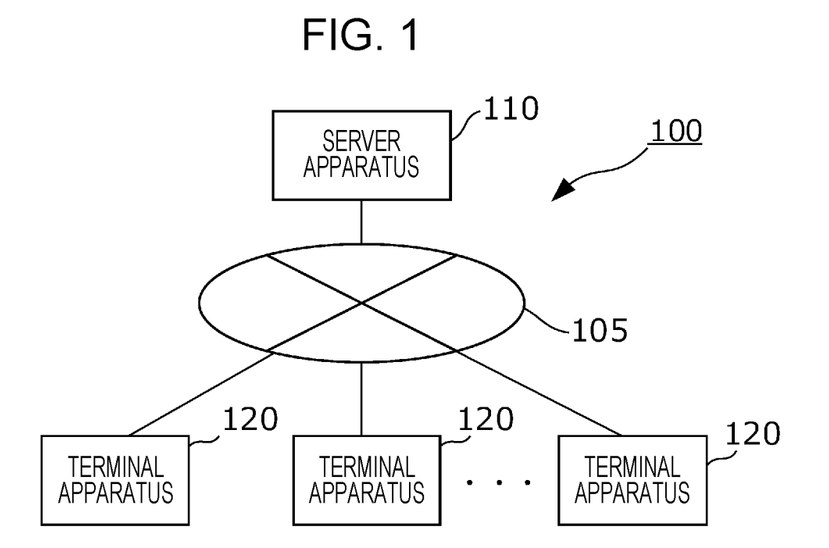
FIG. 1 is a diagram illustrating an example of the configuration of a workflow system according to an exemplary embodiment.

FIG. 1 is a diagram illustrating an example of the configuration of a workflow system 100 according to an exemplary embodiment. The workflow system 100 enables a user to visually recognize a workflow. A "workflow" refers to a series of sequentially performed processes. A workflow includes a series of processes. Data to be processed is input to a workflow. In each of processes included in a workflow, input data is sequentially processed. These processes include, for example, accumulation, sharing, approval, numbering, retrieval, processing, reviewing, application, and disclosure. When a series of processes included in a workflow is completed, processed data is output from the workflow. Plural of pieces of data might be input to a workflow. In this case, these pieces of data are independently processed in the workflow. At this time, these pieces of data may be processed in parallel with each other in the workflow. The workflow system 100 includes a server apparatus 110 and terminal apparatuses 120. These apparatuses are connected to one another over a communication network 105. The Internet or a local area network (LAN), for example, is used as the communication network 105.

Figure 2:
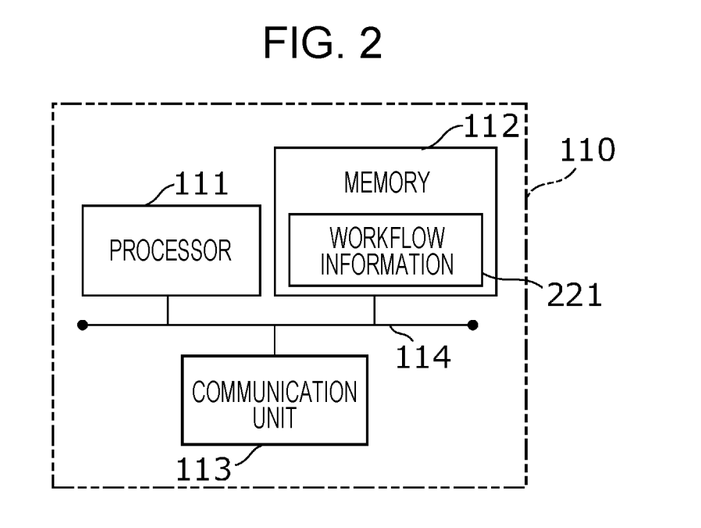
FIG. 2 is a diagram illustrating an example of the configuration of a server apparatus.

FIG. 2 is a diagram illustrating an example of the configuration of the server apparatus 110. The server apparatus 110 has a function of providing a screen including a workflow to the terminal apparatus 120. The server apparatus 110 is an example of an information processing apparatus in the present disclosure. The server apparatus 110 includes a processor 111, a memory 112, and a communication unit 113. These components are connected to one another by a bus 114. The processor 111 executes a program to control the components of the server apparatus 110 and perform processing for achieving functions of the server apparatus 110. A central processing unit (CPU), for example, is used as the processor 111. The memory 112 stores the program for achieving the functions of the server apparatus 110, workflow information 221 indicating a workflow, and data to be processed in the workflow. The data may be document data indicating a document, for example, and created by a registerer using the terminal apparatus 120 or an image processing apparatus (not illustrated). A read-only memory (ROM) and a random-access memory (RAM), for example, are used as the memory 112. The memory 112 may also include a storage device such as a hard disk drive or a solid-state drive (SSD). The communication unit 113 communicates data with other apparatuses connected over the communication network 105. The communication unit 113 includes a communication interface connected to the communication network 105.

Figure 3:
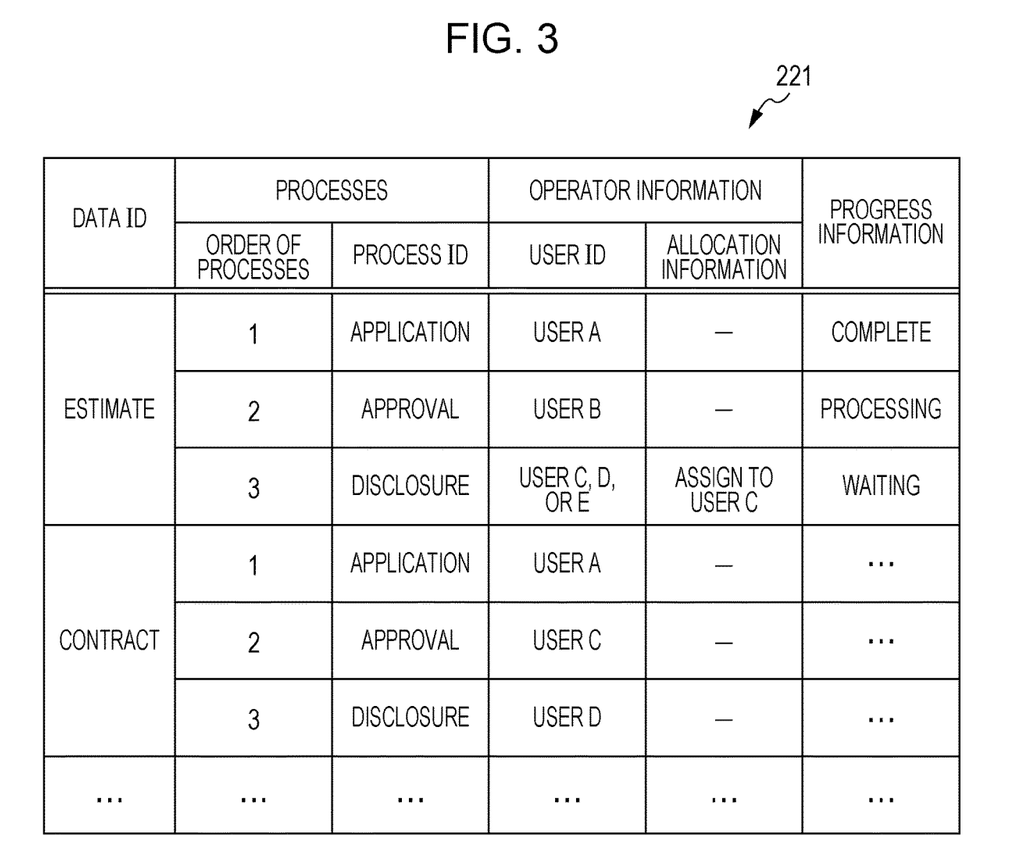
FIG. 3 is a diagram illustrating an example of workflow information.

FIG. 3 is a diagram illustrating an example of the workflow information 221. The workflow information 221 includes data identifiers (IDs), processes, operator information, and progress information. The data IDs are information for uniquely identifying data input to a workflow. In the example illustrated in FIG. 3, an estimate and a contract are input to the workflow as data. The processes indicate a series of processes included in the workflow. The processes include order of processes and process IDs. The order of processes indicates order in which the processes included in the workflow are to be performed. The process IDs are information for uniquely identifying the processes included in the workflow. In the example illustrated in FIG. 3, the workflow includes an application process, in which data is applied for, an approval process, in which the application for the data is approved, and a disclosure process, in which the data is disclosed. The application process, the approval process, and the disclosure process are performed in this order. The operator information is information regarding operators who are to perform the processes included in the workflow. The operator information includes user IDs and allocation information. The user IDs are information for uniquely identifying the operators who are to perform the processes included in the workflow. Operators are determined in advance by the registerer for each piece of data. That is, even with the same process, an operator might be different depending on the piece of data. In the case of the estimate in the example illustrated in FIG. 3, an operator who is to perform the application process is user A, an operator who is to perform the approval process is user B, and an operator who is to perform the disclosure process is user C, D, or E. In the case of the contract, on the other hand, an operator who is to perform the application process is user A, an operator who is to perform the approval process is user C, and an operator who is to perform the disclosure process is "user D". Here, user C performs the disclosure process for the estimate but performs the approval process for the contract. Processes performed by each user might thus be different between different pieces of the data. As for the disclosure process, there are three candidates for the operator, namely users C, D, and E. One of the candidates is allocated and performs the disclosure process. The allocation information indicates an allocation state of an operator for each operation for which there are candidates. The allocation state of an operator can be a state in which no operator has been allocated or a state in which an operator has been allocated. For example, until an operator who is to perform the disclosure process is allocated, the allocation information indicates that no operator has been allocated to the disclosure process. If the disclosure process is assigned to user C, for example, the allocation information indicates, as illustrated in FIG. 3, that the disclosure process has been assigned to user C. The allocation information is updated in accordance with an allocation state of an operator. When an operator is allocated, for example, the allocation information is updated in accordance with an operation performed by a user allocated as the operator. The progress information indicates a progress state of each process included in the workflow. The progress state can be "complete", "processing", or "waiting". "Complete" indicates that the process has been completed. "Processing" indicates that the process is currently being performed. "Waiting" indicates that the process has not yet been performed. The progress information is updated as the process progresses. When the process is completed, for example, the progress information is updated in accordance with an operation performed by the operator.

Figure 4:
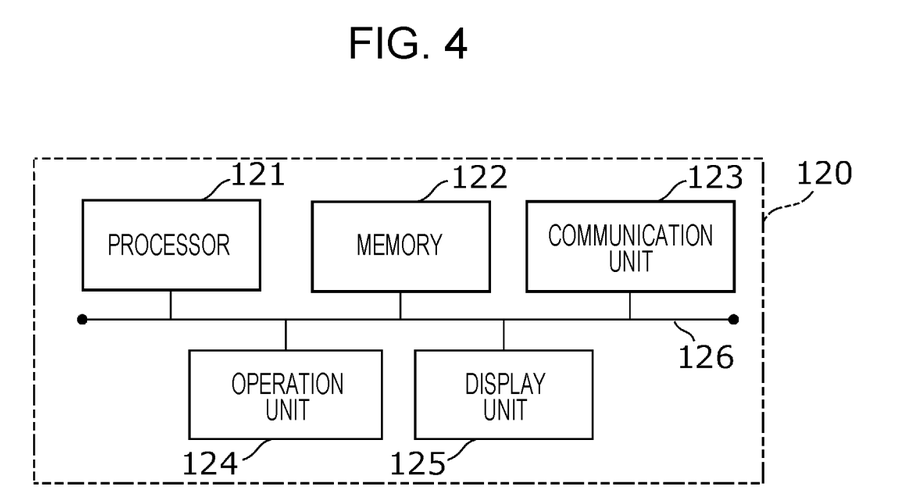
FIG. 4 is a diagram illustrating an example of the configuration of a terminal apparatus.

FIG. 4 is a diagram illustrating an example of the configuration of the terminal apparatus 120. The terminal apparatus 120 is used by a user such as an operator or a registerer. The terminal apparatus 120 has a function of displaying a screen including a workflow. The terminal apparatus 120 includes a processor 121, a memory 122, a communication unit 123, an operation unit 124, and a display unit 125. These components are connected to one another by a bus 126. The processor 121 executes a program to control the components of the terminal apparatus 120 and achieve functions of the terminal apparatus 120. A CPU, for example, is used as the processor 121. The memory 122 stores the program for achieving the functions of the terminal apparatus 120. A ROM and a RAM, for example, are used as the memory 122. The memory 122 may also include a storage device such as a hard disk drive or an SSD. The communication unit 123 communicates data with other apparatuses connected over the communication network 105. The communication unit 123 includes a communication interface connected to the communication network 105. The operation unit 124 is used to operate the terminal apparatus 120. A mouse and a keyboard, for example, are used as the operation unit 124. The display unit 125 displays various screens used to communicate information with the user. A liquid crystal display, for example, is used as the display unit 125.

2. Operation

When the processor 111 or 121 performs processing in the following description, the processing is achieved by performing arithmetic processing or controlling the operation of other hardware elements using the processor 111 or 121 through cooperation between the program stored in the memory 112 or 122 and the processor 111 or 121, which executes the program.

Figure 5:
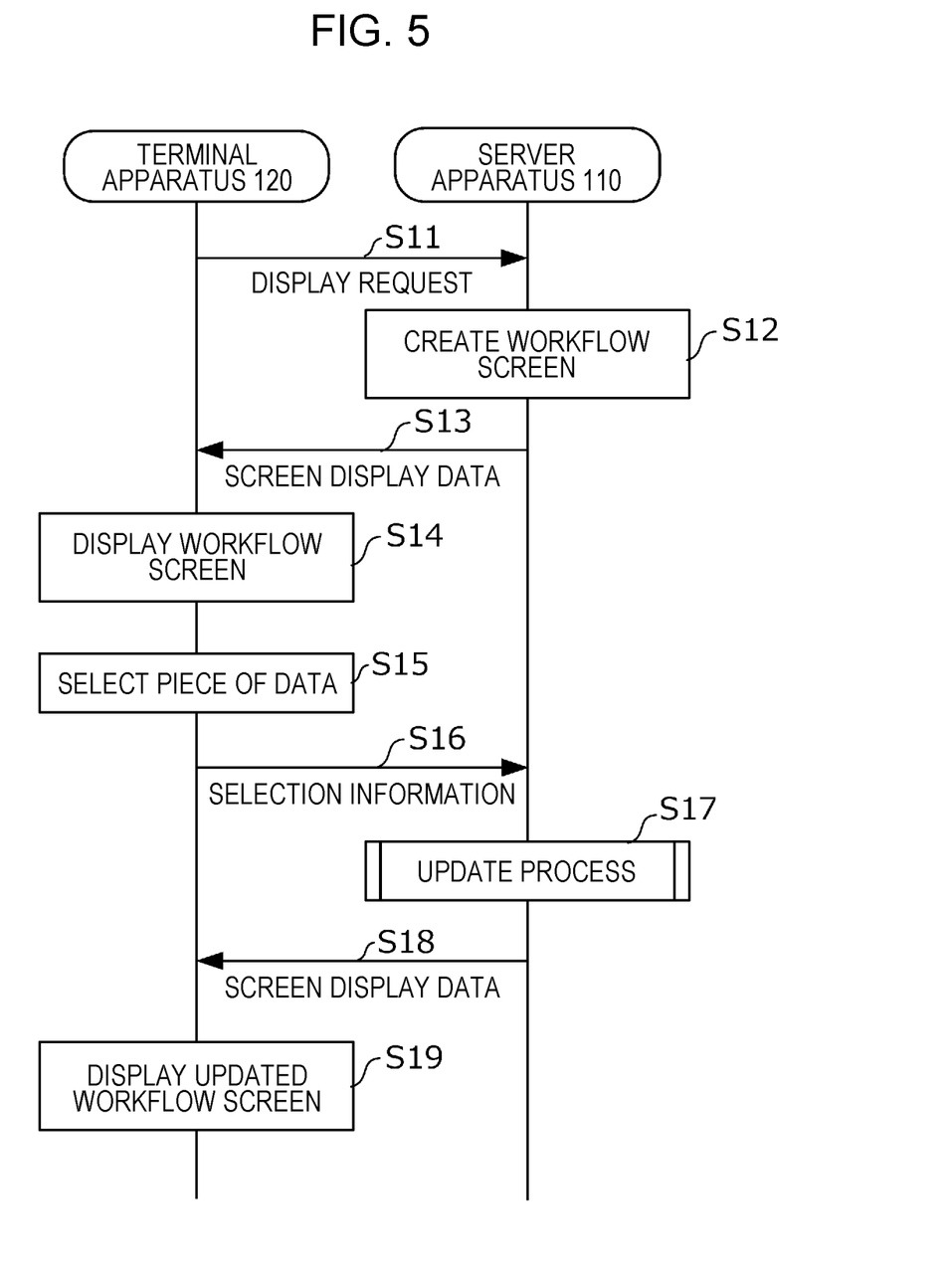
FIG. 5 is a sequence chart illustrating an example of an operation performed by the workflow system.

FIG. 5 is a sequence chart illustrating an example of an operation performed by the workflow system 100. The operation starts when the user uses a workflow. In step S11, the processor 121 of the terminal apparatus 120 transmits a request to display a workflow to the server apparatus 110 in accordance with an operation performed by the user. The request includes a user ID of the user. It is assumed here that the user ID of the user is "user C". The processor 111 of the server apparatus 110 receives the request from the terminal apparatus 120 and, in step S12, creates a workflow screen 130 including the workflow on the basis of the workflow information 221 stored in the memory 112. The user ID included in the request is stored in the memory 112. The workflow screen 130 may be created in advance, instead.

Figure 6:
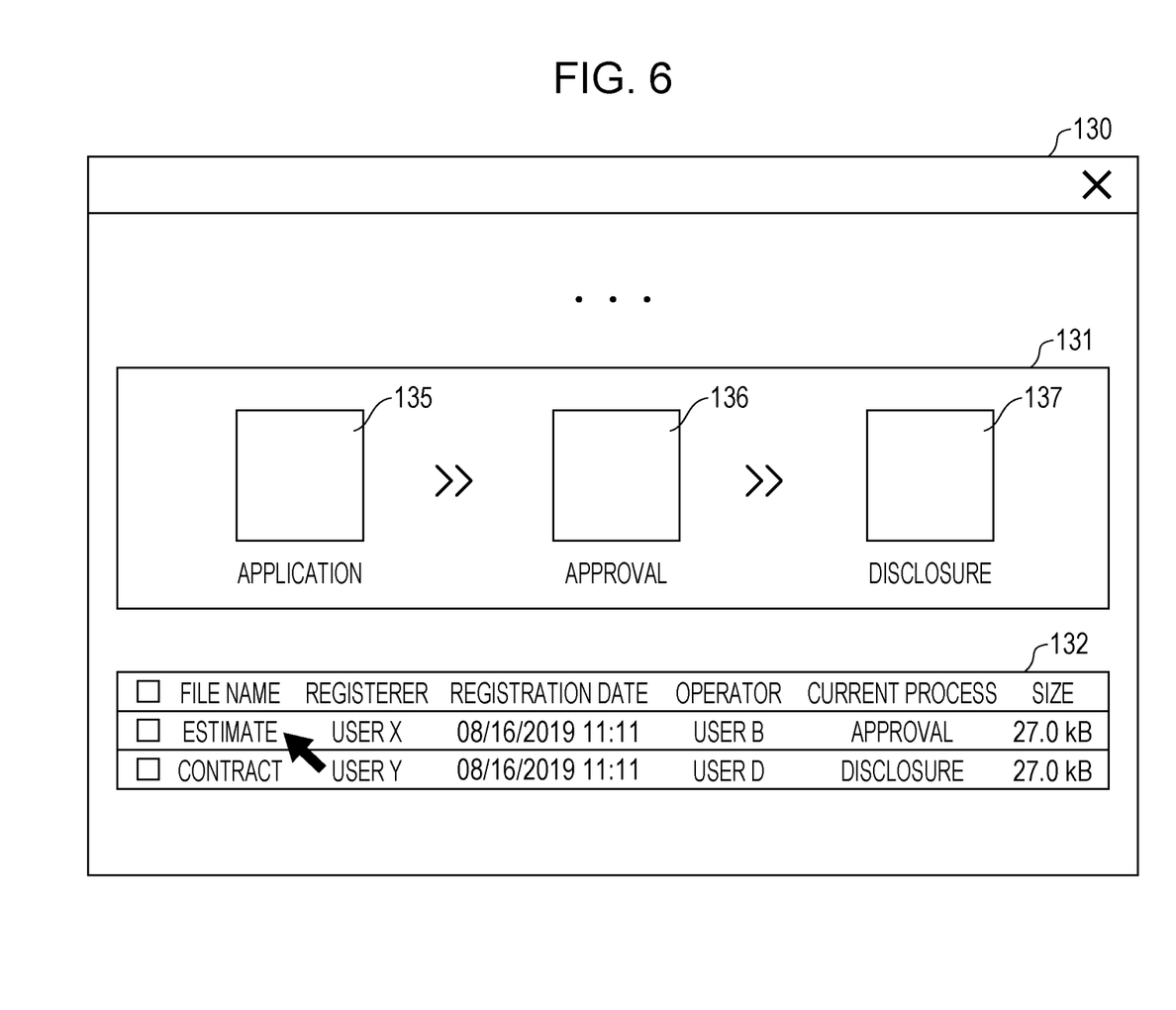
FIG. 6 is a diagram illustrating an example of a workflow screen.

FIG. 6 is a diagram illustrating an example of the workflow screen 130. The workflow screen 130 includes a workflow image 131 and a data list 132. That is, the workflow image 131 and the data list 132 are included in a single screen. The workflow image 131 indicates the processes of the workflow indicated by the workflow information 221. The processes include the order of processes included in the workflow. In the example illustrated in FIG. 3, the workflow includes the application process, the approval process, and the disclosure process, which are performed in this order. In this case, the workflow image 131 includes an icon 135 indicating the application process, an icon 136 indicating the approval process, and an icon 137 indicating the disclosure process. That is, the workflow image 131 is an image obtained by combining the icons 135 to 137 together. The icons 135 to 137 are arranged from left to right in FIG. 6 in accordance with the order in which the application process, the approval process, and the disclosure process are performed. The data list 132 is a list of data to be processed in the workflow indicated by the workflow information 221. In the example illustrated in FIG. 3, the data to be processed in the workflow includes an estimate and a contract. In this case, as illustrated in FIG. 6, the data list 132 includes list information regarding the data including the estimate and the contract. The list information includes, for example, file names of the data, names of registerers of the data, dates of registration of the data, names of operators who are to process the data, names of processes currently being performed on the data, and the size of the data.

In step S13, the processor 111 transmits screen display data for displaying the workflow screen 130 to the terminal apparatus 120 to control the terminal apparatus 120 such that the terminal apparatus 120 displays the workflow screen 130. Upon receiving the image display data from the server apparatus 110, the processor 121 of the terminal apparatus 120 displays, in step S14, the workflow screen 130 on the display unit 125 in accordance with the image display data. The workflow screen 130 illustrated in FIG. 6, for example, is displayed on the display unit 125.

After the terminal apparatus 120 displays the workflow screen 130, the user performs an operation for selecting a desired piece of data on the data list 132 using the operation unit 124. The operation is, for example, an operation for moving the mouse over information regarding the desired piece of data. If the user performs the operation for selecting a piece of data in step S15, the processor 121 of the terminal apparatus 120 transmits, in step S16, selection information, which indicates the selected piece of data, to the server apparatus 110. It is assumed here that the user has selected the estimate. In this case, the processor 121 transmits selection information indicating the estimate.

Upon receiving the selection information from the terminal apparatus 120, the processor 111 of the server apparatus 110 performs, in step S17, a process for updating the workflow screen 130 on the basis of the data indicated by the selection information and the workflow information 221 and the user IDs stored in the memory 112. In the process, the workflow image 131 reflects a progress state of processes for the selected piece of data. If the workflow includes a process for which there are candidates for an operator, the workflow image 131 is changed in such a way as to indicate an allocation state of an operator who is to perform the process. Furthermore, if the user is one of the candidates for the operator who is to perform the process, an icon indicating the process is highlighted. In the following description, a process for which a user is one of candidates for an operator will be referred to as a "target process". An icon indicating a target process is an example of a target part in the present disclosure.

Figure 7:
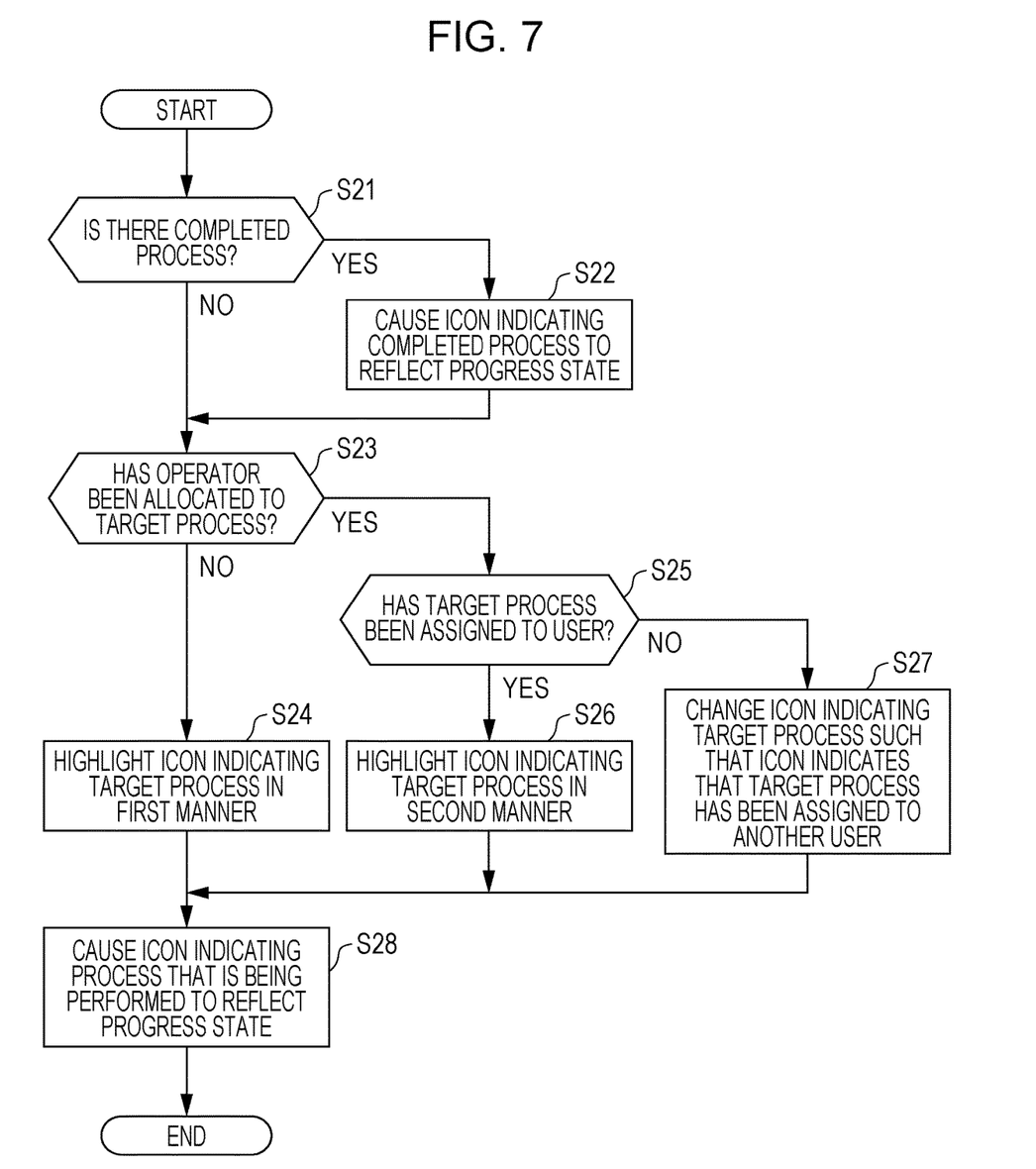
FIG. 7 is a flowchart illustrating an example of a process for updating the workflow screen.

FIG. 7 is a flowchart illustrating an example of the process for updating the workflow screen 130. FIGS. 8 to 12 are diagrams illustrating examples of the workflow screen 130 updated as a result of the process. In the process, a manner in which an icon indicating a target process is displayed differs between when no operator has been allocated to the target process, when the target process has been assigned to the user, and when the target process has been assigned to another user. It is assumed here, as illustrated in FIG. 3, that the series of processes of the estimate included in the workflow includes a target process.

In step S21, the processor 111 determines whether there is a process that has been completed for the selected piece of data. As described above, it is assumed here that the estimate has been selected. As illustrated in FIG. 3, for example, if progress information indicates that a progress state of the application process is "complete" among the processes for the estimate, it is determined that there is a process that has been completed for the selected piece of data (YES in step S21). If it is determined that there is a process that has been completed for the selected piece of data, the processor 111 causes the process to proceed to step S22.

Figure 8:
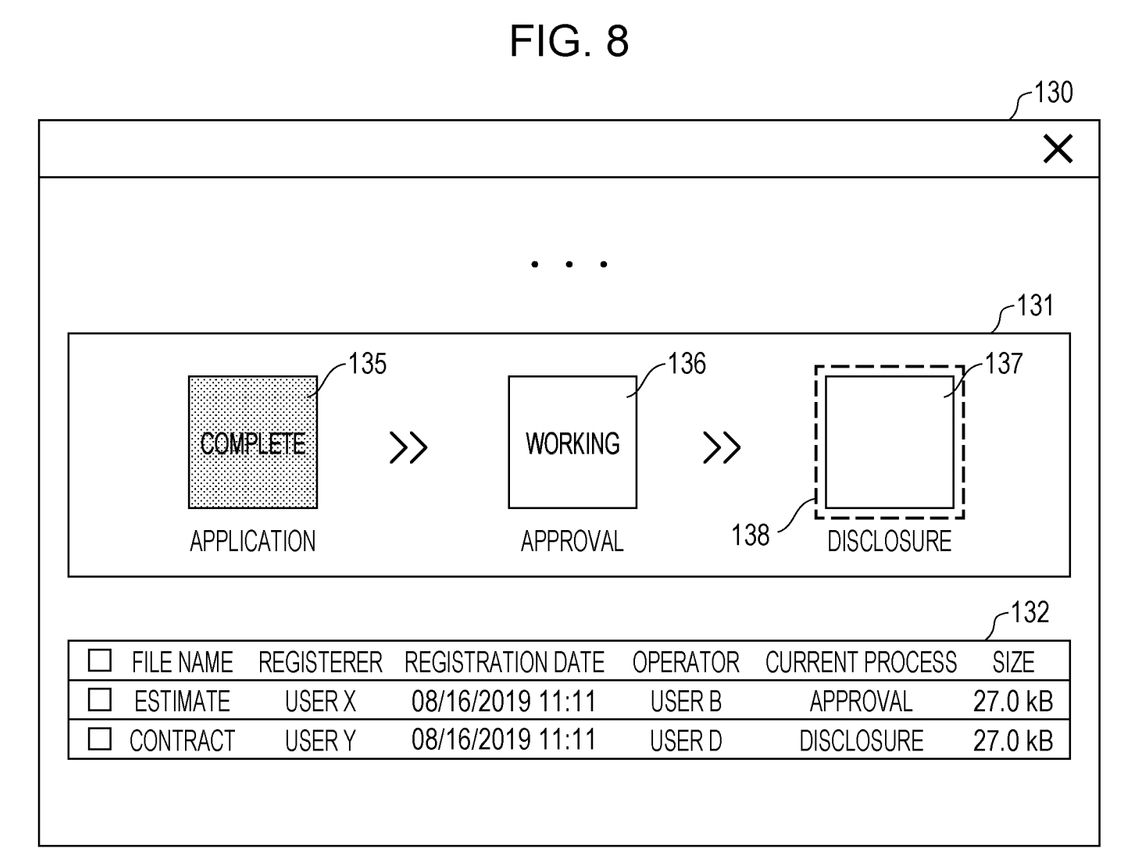
FIG. 8 is a diagram illustrating an example of the updated workflow screen.

In step S22, the processor 111 causes an icon indicating the process that has been completed to reflect the progress state of the process. If the progress state of the application process for the estimate indicates "complete" as described above, for example, the icon 135 indicating the application process is grayed out as illustrated in FIG. 8 so that the icon 135 becomes inconspicuous, and a word "complete" indicating that the application process has been completed is added to the icon 135.

If it is determined in the above-described step S21 that there is no process that has been completed for the selected piece of data (NO in step S21), on the other hand, the processor 111 causes the process to proceed to step S23 while skipping step S22. In step S23, the processor 111 determines whether an operator has been allocated to a target process. In the example illustrated in FIG. 3, there are candidates for an operator who is to perform the disclosure process for the estimate. If no operator has been allocated to the disclosure process for the estimate, the allocation information included in the workflow information 221 indicates that no operator has been allocated to the disclosure process. In this case, it is determined that no operator has been allocated to the target process (NO in step S23), the processor 111 causes the process to proceed to step S24.

In step S24, the processor 111 changes the icon indicating the target process such that the icon is highlighted in a first manner. As described above, it is assumed here that the user ID of the user is "user C". In the example illustrated in FIG. 3, the user whose user ID is "user C" is one of candidates for an operator who is to perform the disclosure process for the estimate. In this case, as illustrated in FIG. 8, a blue broken frame 138 is added to the icon 137 indicating the disclosure process.

If the disclosure process is assigned to any of the candidates for the operator who is to perform the disclosure process, on the other hand, the allocation information is updated in such a way as to indicate that the disclosure process has been assigned to one of the candidates for the operator. In this case, it is determined in the above-described step S23 that an operator has been allocated to the target process (YES in step S23), the processor 111 causes the process to proceed to step S25. In step S25, the processor 111 determines whether the target process has been assigned to the user. If the disclosure process is assigned to user C (YES in step S25), for example, the processor 111 causes the process to proceed to step S26.

Figure 9:
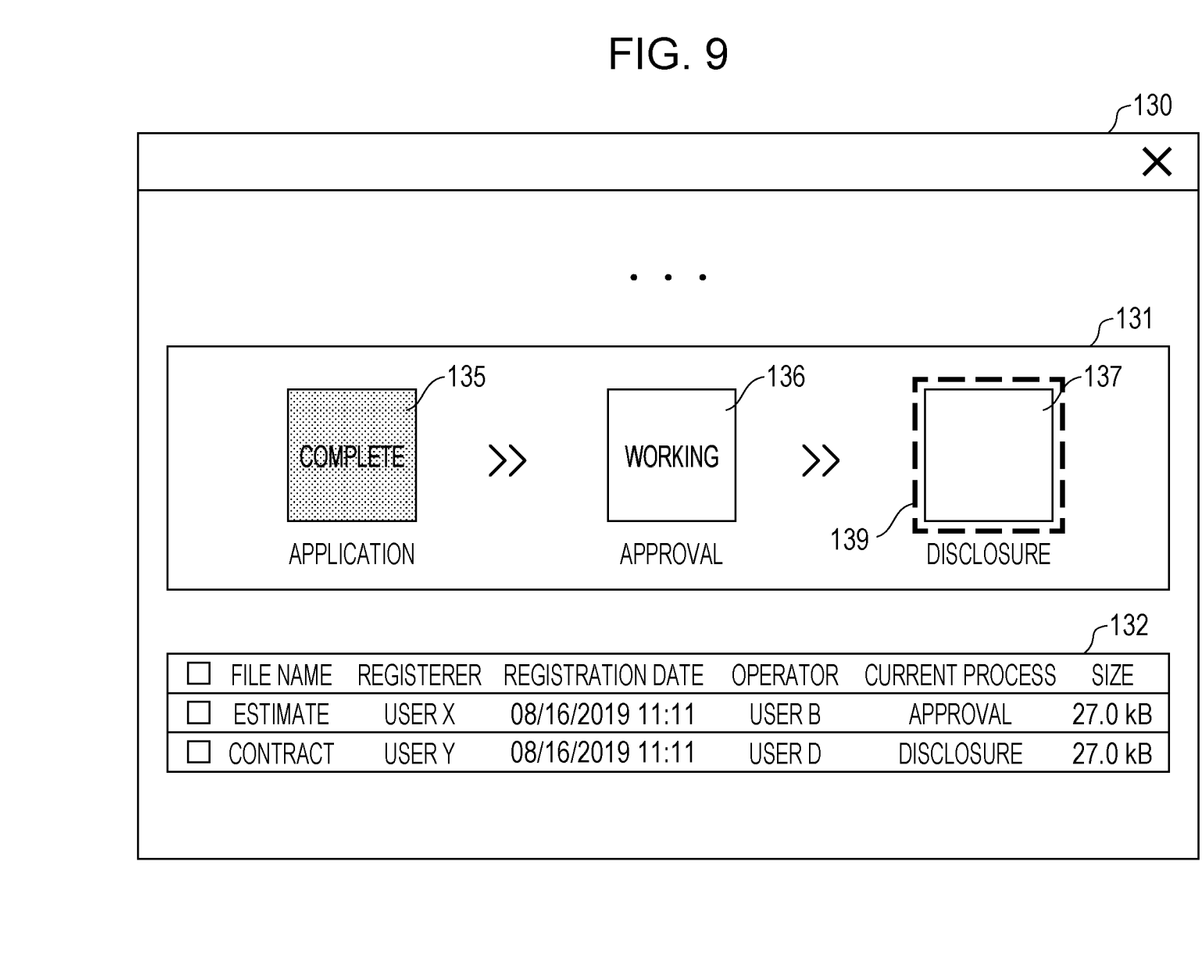
FIG. 9 is a diagram illustrating another example of the updated workflow screen.

In step S26, the processor 111 changes the icon indicating the target process such that the icon is highlighted in a second manner. The highlighting in the second manner is more conspicuous than the above-mentioned highlighting in the first manner. As illustrated in FIG. 3, for example, if the disclosure process for the estimate is assigned to user C, a red broken frame 139 is added to the icon 137 indicating the disclosure process as illustrated in FIG. 9.

If the disclosure process for the estimate is assigned to user D or E, on the other hand, the allocation information indicates that the disclosure process for the estimate has been assigned to user D or E. In this case, it is determined in the above-described step S25 that the target process has been assigned to another user (NO in step S25), the processor 111 causes the process to proceed to step S27.

Figure 10:
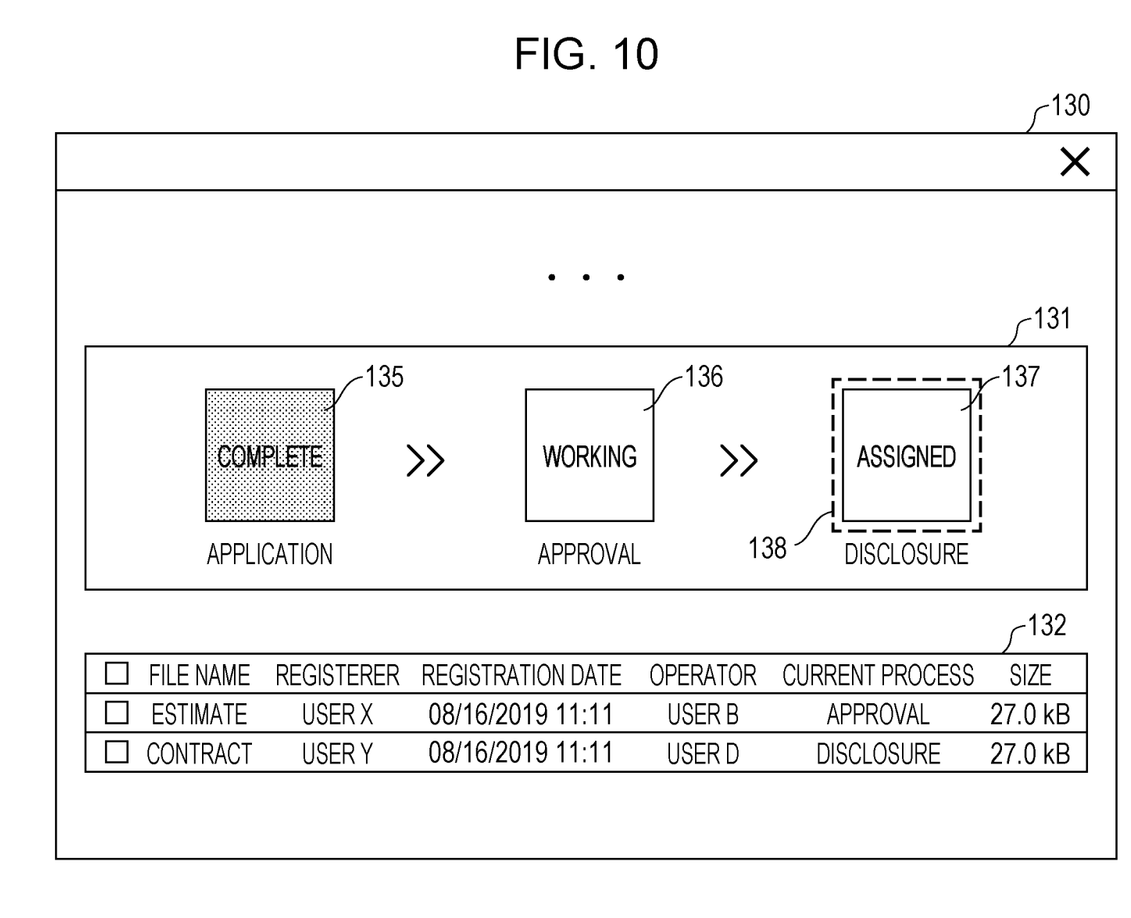
FIG. 10 is a diagram illustrating another example of the updated workflow screen.

In step S27, the processor 111 changes the icon indicating the target process such that the icon indicates that the target process has been assigned to another user. A manner in which an icon is displayed in such a way as to indicate that a target process has been assigned to another user is an example of display in a third manner in the present disclosure. As in FIG. 8, if the disclosure process for the estimate has been assigned to a user other than user C, for example, the blue broken frame 138 is added to the icon 137 indicating the disclosure process as illustrated in FIG. 10. A word "assigned" indicating that the disclosure process has been assigned to another user is also added to the icon 137.

After a user is allocated to a target process as an operator, the operator might be replaced by another user in accordance with an operation performed by yet another user. For example, after the disclosure process for the estimate is assigned to user D or E, for example, user C might newly assign the disclosure process to himself/herself by selecting the icon 137 indicating the disclosure process. If the operator for the disclosure process for the estimate is replaced like this, the allocation information included in the workflow information 221 is updated in such a way as to indicate that the operator for the disclosure process has changed from user D or E to user C. In this case, the red broken frame 139 is added to the icon 137 indicating the disclosure process as illustrated in FIG. 9.

Figure 11:
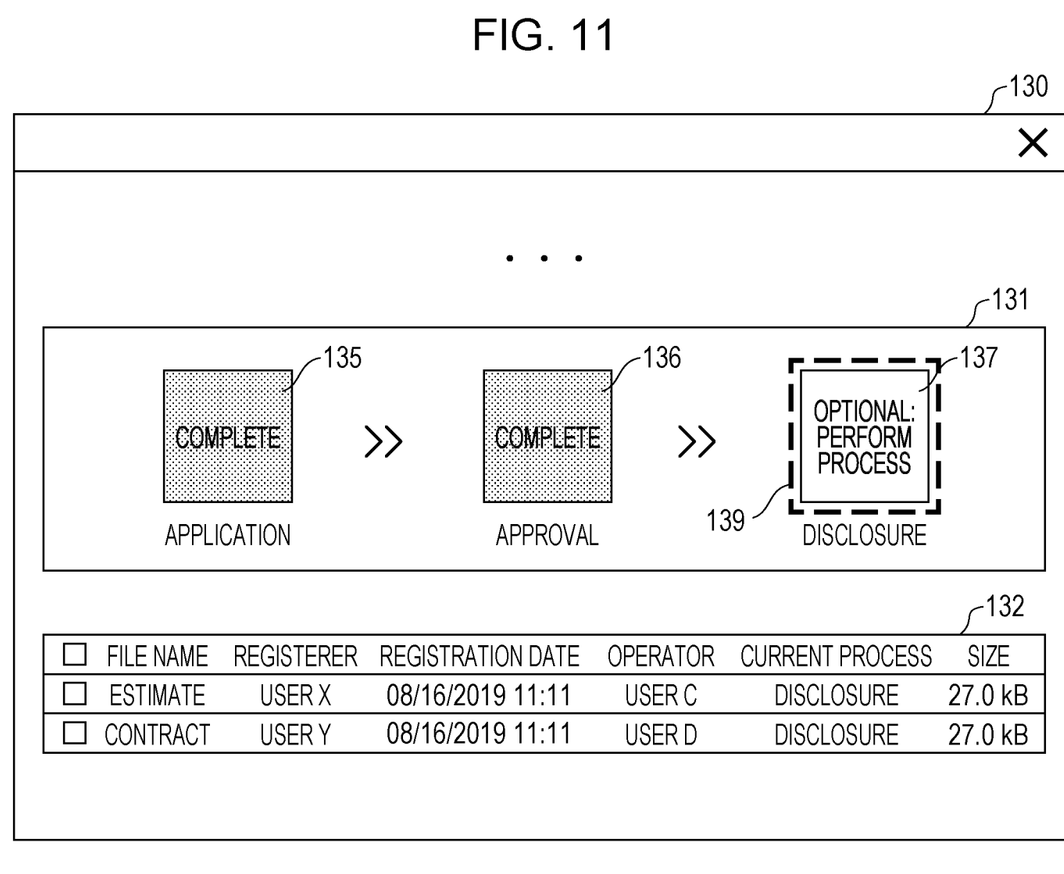
FIG. 11 is a diagram illustrating another example of the updated workflow screen.
Figure 12:
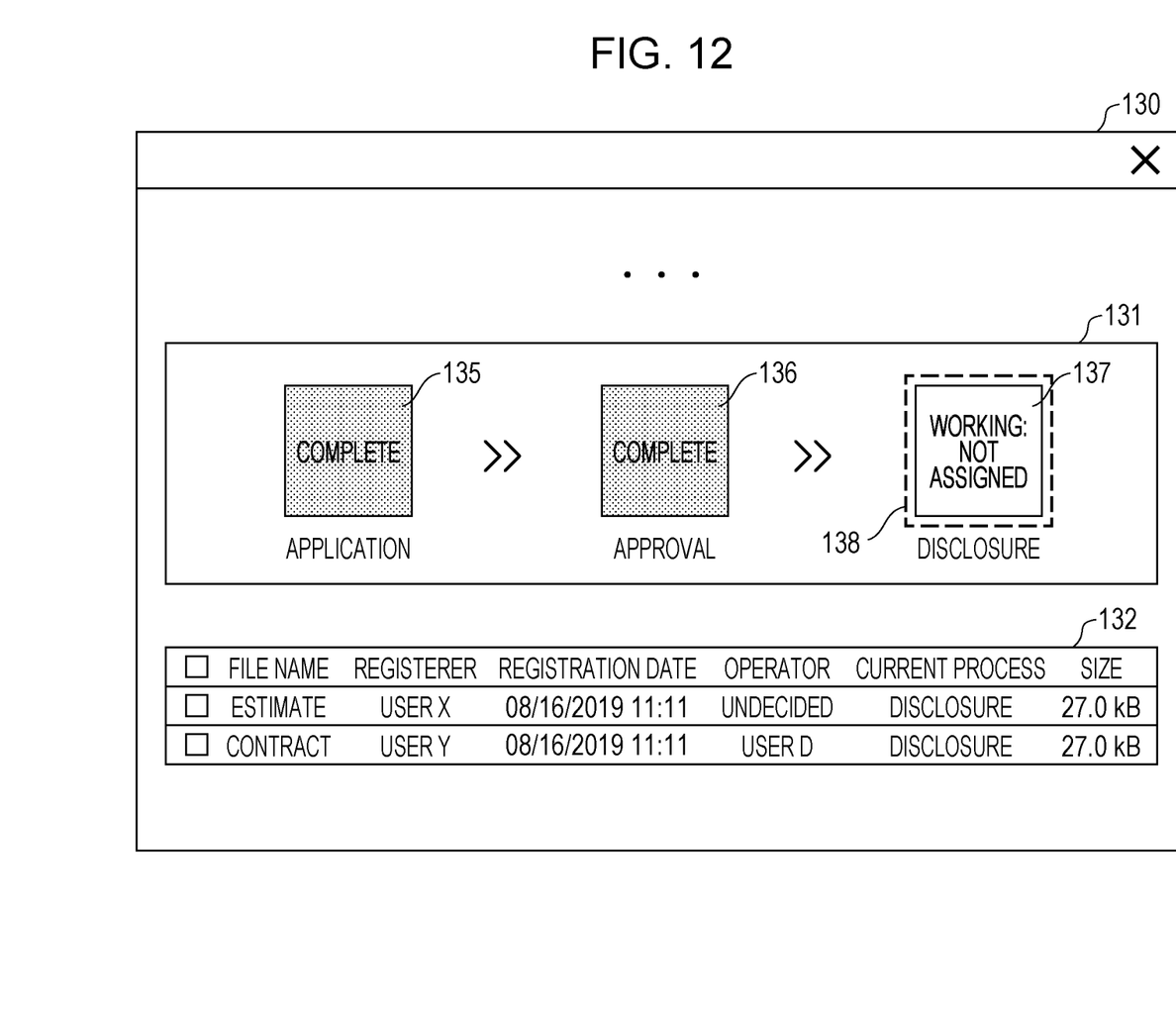
FIG. 12 is a diagram illustrating another example of the updated workflow screen.

In step S28, the processor 111 causes an icon indicating a process for the selected piece of data that is being performed to reflect a progress state of the process. If the progress information indicates that a progress state of the approval process for the estimate is "processing" as illustrated in FIG. 3, for example, a word "working" indicating that the approval process is being performed is added to the icon 136 indicating the approval process as illustrated in FIGS. 8 to 10. If the approval process, which is performed immediately before the disclosure process in the estimate, is completed with the disclosure process assigned to the user as described above, the progress information is updated in such a way as to indicate that the approval process has been completed. In this case, as illustrated in FIG. 11, the red broken frame 139 added to the icon 137 indicating the disclosure process flashes, and words "optional: perform process" for encouraging the user to perform the disclosure process are added to the icon 137. If the approval process, which is performed immediately before the disclosure process for the estimate, is completed without an operator allocated to the disclosure process, on the other hand, the progress information is updated in such a way as to indicate that the approval process has been completed. In this case, as illustrated in FIG. 12, the blue broken frame 138 added to the icon 137 indicating the disclosure process flashes, and words "working: not assigned" indicating that the disclosure process is to be performed but no operator has been allocated to the disclosure process are added to the icon 137. When the process for updating the workflow screen 130 ends, the process illustrated in FIG. 5 resumes.

In step S18, the processor 111 transmits screen display data for displaying the workflow screen 130 updated in the above-described process to the terminal apparatus 120 to control the terminal apparatus 120 such that the terminal apparatus 120 displays the updated workflow screen 130. Upon receiving the screen display data from the server apparatus 110, the processor 121 of the terminal apparatus 120 displays, in step S19, the updated workflow screen 130 on the display unit 125 in accordance with the screen display data. At this time, an icon indicating a target process is displayed differently in accordance with an allocation state of an operator for the target process.

Before an operator is allocated to the disclosure process, for example, the workflow screen 130 illustrated in FIG. 8 is displayed on the display unit 125. On the workflow screen 130, the workflow image 131 reflects the progress states of the application process, the approval process, and the disclosure process for the estimate selected by the user. Since the candidates for the operator who is to perform the disclosure process include the user, the icon 137 indicating the disclosure process is highlighted in the first manner, that is, the blue broken frame 138 is added to the icon 137. If the approval process, which is performed immediately before the disclosure process, is completed without an operator assigned to the disclosure process, a manner in which the icon 137 indicating the disclosure process is displayed is changed from that illustrated in FIG. 8 to that illustrated in FIG. 12. In this case, as illustrated in FIG. 12, the blue broken frame 138 flashes and the words "working: not assigned" are added to the icon 137.

If the disclosure process for the estimate is assigned to the user, the manner in which the icon 137 indicating the disclosure process is displayed is changed from that illustrated in FIG. 8 to that illustrated in FIG. 9. In this case, as illustrated in FIG. 9, the icon 137 is highlighted in the second manner, that is, the red broken frame 139 is added to the icon 137. If the approval process, which is performed immediately before the disclosure process in the estimate, is completed with the disclosure process assigned to the user, the manner in which the icon 137 indicating the disclosure process is displayed is changed from that illustrated in FIG. 9 to that illustrated in FIG. 11. In this case, as illustrated in FIG. 11, the red broken frame 139 flashes and the words "optional: perform process" are added to the icon 137.

If the disclosure process for the estimate is assigned to another user, on the other hand, the manner in which the icon 137 indicating the disclosure process is displayed is changed from that illustrated in FIG. 8 to that illustrated in FIG. 10. In this case, as illustrated in FIG. 10, the blue broken frame 138 and the word "assigned" are added to the icon 137, so that the icon 137 indicates that the disclosure process has been assigned to another user. If an assignee of the disclosure process for the estimate is changed to the user after the disclosure process is assigned to another user, the manner in which the icon 137 indicating the disclosure process is changed from that illustrated in FIG. 10 to that illustrated in FIG. 9. In this case, as illustrated in FIG. 9, the red broken frame 139 is added to the icon 137.

If a predetermined allocation time comes without an operator allocated to a target process, the processor 111 performs a process for assigning the target process to one of candidates for an operator. The predetermined allocation time may be, for example, a time at which a process immediately before the target process is completed or a time determined by a registerer during registration of the workflow. The process for assigning the target process may be performed in accordance with an operation performed by the user or without an operation performed by the user. The user may be, for example, a candidate for the operator for the target process or a manager of the candidates for the operator. When the workflow screen 130 illustrated in FIG. 12 is displayed, for example, one of the candidates for the operator who is to perform the target process may select the icon 137 indicating the disclosure process to assign the target process to himself/herself.

If the process for assigning the target process is performed without an operation performed by the user, on the other hand, the processor 111 performs the process, for example, using at least the volume or a deadline of a process already assigned to each of the candidates for the operator or estimated processing time of each of the candidates for the operator. In this case, the memory 112, for example, stores the volume or the deadline of the process already assigned to each of the candidates for the operator or the estimated processing time of each of the candidates for the operator. The estimated processing time of each of the candidates for the operator may be calculated using a history of processes performed by the candidate in the past. The target process may then be assigned to, among the candidates for the operator, a candidate to whom a smallest amount of work has been assigned. Alternatively, the target process may be assigned to, among the candidates for the operator, a candidate to whom a process whose deadline is the latest has been assigned. Alternatively, the target process may be assigned to, among the candidates for the operator, a candidate whose estimated processing time is the shortest. Alternatively, in consideration of the volume and the deadline of the process already assigned to each of the candidates for the operator and the estimated processing time of each of the candidates for the operator, the target process may be assigned to a candidate who would perform the target process most efficiently among the candidates for the operator. Alternatively, the processor 111 may assign the target process to one of the candidates for the operator in the round-robin protocol. In this case, target processes are sequentially assigned to the candidates for the operator.

After an operator is allocated to a target process in this manner, the workflow screen 130 is updated and displayed. If the disclosure process for the estimate is assigned to the user, for example, the workflow screen 130 illustrated in FIG. 11 is displayed.

According to the above-described exemplary embodiment, when there are candidates for an operator who is to perform a process included in a workflow, an allocation state of the operator is identified since the displayed workflow image 131 reflects the allocation state of the operator. In addition, since a manner in which an icon indicating a target process is displayed is different between when the target process has been assigned to the user and in other cases, whether the user, among candidates for an operator, needs to perform the process is clear. Furthermore, when none of candidates for an operator has been allocated to a target process, an icon indicating the target process is highlighted in the first manner, and the user understands that he/she might need to perform the target process. Furthermore, when a target process has been assigned to the user, an icon indicating the target process is highlighted in the second manner, and the user understands that the target process has been assigned to him/her. Furthermore, if a process immediately before a target process is completed without none of candidates for an operator allocated to the target process, the target process is assigned to one of the candidates for the operator and accordingly an icon indicating the target process is displayed differently. The user understands, therefore, that an operator has been assigned to the target process. Furthermore, if a target process is assigned to another user, an icon indicating the target process is displayed in such a way as to indicate that the target process has been assigned to the other user, and the user understands that he/she need not perform the target process. Furthermore, if an assignee of a target process has been changed from another user to the user, an icon indicating the target process that has been displayed in such a way as to indicate that the target process has been assigned to the other user is highlighted in the second manner, and the user understands that he/she needs to perform the target process as a result of the change to the assignee. Furthermore, if a process immediately before a target process is completed with the target process assigned to the user, an icon indicating the target process is displayed differently, and the user understands that he/she is now allowed to perform the target process.

3. Modifications

The above-described exemplary embodiment is an example of the present disclosure. The present disclosure is not limited to the above-described exemplary embodiment. In addition, the above-described exemplary embodiment may be modified in the following manners and implemented. Any selective combination of two or more of the following modifications may also be employed.

In the above-described exemplary embodiment, the displayed workflow image 131 may reflect an allocation state of an operator even if a person other than candidates for the operator who is to perform a target process has displayed the workflow screen 130. In this case, an icon indicating the target process may be displayed differently between when an operator has been allocated to the target process and when no operator has been allocated to the target process. Information indicating an operator allocated to the target process may also be displayed on the icon indicating the target process.

In the above-described exemplary embodiment, the number of operators allocated to a target process is not limited to one. For example, plural operators may be allocated to a target process, instead. In this case, for example, an icon indicating the target process is highlighted in the first manner until a required number of operators are allocated. At this time, a value obtained by subtracting the number of operators already allocated to the target process from the required number of operators may be displayed on the icon. As a result, the number of operators that the target process still needs becomes clear. When the required number of operators are allocated, the icon indicating the target process that has been highlighted in the first manner is highlighted in the second manner.

In the above-described exemplary embodiment, a workflow may branch at any point. In this case, if it is confirmed that the workflow will proceed to a branch including a target process, a displayed icon indicating the target process reflects an allocation state of an operator as in the above-described exemplary embodiment. If it is confirmed that the workflow will proceed to a branch that does not include a target process, an icon indicating the target process is grayed out so that the icon becomes inconspicuous.

In the above-described exemplary embodiment, a manner in which a displayed workflow image reflects a progress state of a process is not limited to graying out or addition of the word "working". For example, another additional image, another word, a sign, or a number indicating the progress state of the process may be added to the icon, or the color, shape, or size of the icon may be changed, instead.

In the above-described exemplary embodiment, a method for highlighting an icon is not limited to addition of a frame. For example, an additional image, a word, a sign, or a number may be added to the icon so that the icon becomes conspicuous, or the color, shape, or size of the icon may be changed, instead. In addition, an icon indicating a process to be performed by the user may be changed to a face image of the user stored in the memory 112 in advance, instead. The face image may be one that has been captured or an illustration.

In the above-described exemplary embodiment, a difference between the first manner and the second manner in which an icon is highlighted is not limited to the color of a frame added to the icon. For example, a type, thickness, size, or decoration of a frame added to the icon may be different between the first manner and the second manner in which the icon is highlighted, instead. Alternatively, a word or an additional image added to the icon or the color, shape, or size of the icon may be different. In addition, a method for indicating, on an icon, that a target process has been assigned to another user is not limited to the addition of the blue broken frame 138 and the word "assigned". The color, shape, or size of the icon may be changed or an additional image or a word may be added to the icon such that it becomes clear that the target process has been assigned to the other user. For example, the icon may be grayed out.

In the above-described exemplary embodiment, processes included in a workflow are not limited to those described above. Any process may be included in a workflow insofar as the process is processing of data.

In the above-described exemplary embodiment, the components that perform processes in the workflow system 100 are examples, and the components used are not limited to these examples. For example, at least a part of a process performed in the workflow system 100 may be performed in another apparatus, instead. In addition, the order in which the processes are performed in the workflow system 100 in the above-described exemplary embodiment is an example, and the order may be changed insofar as no contradiction is caused.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The present disclosure may be implemented as programs executed in the server apparatus 110 and the terminal apparatus 120. The server apparatus 110 and the terminal apparatus 120 are examples of a computer in the present disclosure. These programs may be downloaded over a communication network such as the Internet, or stored in a computer readable storage medium, such as a magnetic storage medium (magnetic tape, a magnetic disk, etc.), an optical storage medium (an optical disc, etc.), a magneto-optical storage medium, or a semiconductor memory, and provided.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
perform control to display a workflow image indicating a series of processes included in a workflow;
change display of the workflow image such that the workflow image indicates an allocation state of an operator who is to perform a target process, of the series of processes, and for which there are a plurality of candidates for the operator, wherein
the allocation state of the operator indicates whether or not a candidate of the plurality of candidates has been assigned as the operator to perform the target process;
assign the candidate as the operator to perform the target process based on a history of processes performed by the candidate in the past; and
change display of the workflow image such that a target part, which indicates the target process of the workflow image, is displayed differently when the target process has been assigned to the candidate than when the target process has not been assigned to the candidate.

2. The information processing apparatus according to claim 1,
wherein the processor is configured to change a manner in which a target part, which indicates the target process, of the workflow image is displayed between when the target process has been assigned to a user who is one of the plurality of candidates for the operator and in other cases.

3. The information processing apparatus according to claim 2,
wherein the processor is configured to, if none of the plurality of candidates for the operator is allocated to the target process, display the target part while highlighting the target part in a first manner.

4. The information processing apparatus according to claim 3,
wherein the processor is configured to change, if the target process is assigned to the user, the manner in which the target part is displayed from the first manner to a second manner, which is different from the first manner.

5. The information processing apparatus according to claim 3,
wherein the processor is configured to change, if a process immediately before the target process is completed without any of the plurality of candidates for the operator allocated to the target process, the manner in which the target part is displayed in accordance with allocation of one of the plurality of candidates for the operator who is to perform the target process.

6. The information processing apparatus according to claim 3, wherein the processor is configured to change, if the target process is assigned to an person other than the user who is included in the plurality of candidates for the operator, the manner in which the target part is displayed from the first manner to a third manner, which indicates that the target process has been assigned to the person.

7. The information processing apparatus according to claim 6, wherein the processor is configured to change, if an assignee of the target process is changed from the person to the user, the manner in which the target part is displayed from the third manner to a second manner, which is different from the first manner.

8. The information processing apparatus according to claim 2, wherein the processor is configured to change, in a case where a process immediately before the target process included in the series of processes is completed, the manner in which the target part is displayed.

9. A non-transitory computer readable medium storing a program causing a computer to execute a process comprising:

performing control to display a workflow image indicating a series of process included in a workflow;

changing display of the workflow image such that the workflow image indicates an allocation state of an operator who is to perform a target process, of the series of processes, and for which there are a plurality of candidates for the operator, wherein the allocation state of the operator indicates whether or not a candidate of the plurality of candidates has been assigned as the operator to perform the target process;

assigning the candidate as the operator to perform the target process based on a history of processes performed by the candidate in the past; and changing display of the workflow image such that a target part, which indicates the target process of the workflow image, is displayed differently when the target process has been assigned to the candidate than when the target process has not been assigned to the candidate.

10. An information processing apparatus comprising:

means for performing control to display a workflow image indicating a series of processes included in a workflow;

means for changing display of the workflow image such that the workflow image indicates an allocation state of an operator who is to perform a target process, of the series of processes, and for which there are a plurality of candidates for the operator, wherein the allocation state of the operator indicates whether or not a candidate of the plurality of candidates has been assigned as the operator to perform the target process;

means for assigning the candidate as the operator to perform the target process based on a history of processes performed by the candidate in the past; and means for changing display of the workflow image such that a target part, which indicates the target process of the workflow image, is displayed differently when the target process has been assigned to the candidate than when the target process has not been assigned to the candidate.

11. The information processing apparatus according to claim 1, wherein the processor is configured to change display of the workflow image such that a target part, which indicates the target process of the workflow image, is displayed differently when the target process has been assigned to the candidate than when the target process has not been assigned to the candidate.

12. The non-transitory computer readable medium according to claim 9, the program causing the computer to execute the process comprising:

changing display of the workflow image such that a target part, which indicates the target process of the workflow image, is displayed differently when the target process has been assigned to the candidate than when the target process has not been assigned to the candidate.

13. The information processing apparatus according to claim 10, comprising:

means for changing change display of the workflow image such that a target part, which indicates the target process of the workflow image, is displayed differently when the target process has been assigned to the candidate than when the target process has not been assigned to the candidate.

\* \* \* \* \*